United States Patent
Nomoto

(10) Patent No.: US 8,386,693 B2
(45) Date of Patent: Feb. 26, 2013

(54) INFORMATION PROCESSING DEVICE AND INFORMATION PROCESSING METHOD

(75) Inventor: Shohei Nomoto, Tokyo (JP)

(73) Assignee: NEC Corporation, Tokyo (JP)

( * ) Notice: Subject to any disclaimer, the term of this patent is extended or adjusted under 35 U.S.C. 154(b) by 184 days.

(21) Appl. No.: 12/737,876

(22) PCT Filed: Aug. 19, 2009

(86) PCT No.: PCT/JP2009/064506
§ 371 (c)(1),
(2), (4) Date: Feb. 25, 2011

(87) PCT Pub. No.: WO2010/024162
PCT Pub. Date: Mar. 4, 2010

(65) Prior Publication Data
US 2011/0153947 A1    Jun. 23, 2011

(30) Foreign Application Priority Data
Aug. 29, 2008  (JP) .................................. 2008-222498

(51) Int. Cl.
*G06F 12/00* (2006.01)
(52) U.S. Cl. ..................................... 711/5; 711/E12.001
(58) Field of Classification Search .......................... None
See application file for complete search history.

(56) References Cited

U.S. PATENT DOCUMENTS

| | | | |
|---|---|---|---|
| 6,404,232 B1 | 6/2002 | Mizuno et al. | |
| 2005/0262328 A1* | 11/2005 | De Baere | 712/205 |
| 2006/0053271 A1* | 3/2006 | Nishioka et al. | 712/208 |

FOREIGN PATENT DOCUMENTS

| | | | |
|---|---|---|---|
| JP | 7-182169 | A | 7/1995 |
| JP | 10-190444 | A | 7/1998 |
| JP | 11-509664 | T | 8/1999 |
| JP | 2004-78627 | A | 3/2004 |
| JP | 2005-535045 | T | 11/2005 |

* cited by examiner

*Primary Examiner* — Charles Rones
*Assistant Examiner* — Ralph A Verderamo, III
(74) *Attorney, Agent, or Firm* — McGinn IP Law Group, PLLC

(57) ABSTRACT

In an information processing device for processing VLIW includes memory banks, a memory banks are used to store an instruction word group constituting a very-long instruction. A program counter outputs an instruction address indicating a head memory bank containing a head part of the very long instruction of the next cycle. A memory bank control device uses information regarding the instruction address for the very long instruction and the number of memory banks associated with the very long instruction to specify the use memory bank to be used in the next cycle and the nonuse memory bank not to be used in the next cycle. The memory bank control device controls the operation of the nonuse memory bank. The instruction decoder decodes the very long instruction fetched from the use memory bank. An arithmetic device executes the decoded very long instruction.

20 Claims, 6 Drawing Sheets

SUCCESSIVE INSTRUCTION
PRESCRIPTION BIT $\alpha$

Fig. 6

| | MB₀ | MB₁ | MB₂ | MB₃ | THE NUMBER OF MEMORY BANK |
|---|---|---|---|---|---|
| CYCLE N | A_N OPERATION | STOP | STOP | STOP | X_N |
| CYCLE N+1 | STOP | STOP | A_{N+1} OPERATION | STOP | X_{N+1} |
| CYCLE N+2 | | | | A_{N+2} OPERATION | X_{N+2} |
| CYCLE N+3 | | | | A_{N+3} OPERATION | X_{N+3} |

INFORMATION PROCESSING DEVICE AND INFORMATION PROCESSING METHOD

TECHNICAL FIELD

The present invention relates to an information processing device and an information processing method. In particular, the present invention relates to an information processing device and an information processing method for processing the Very Long Instruction Words.

BACKGROUND ART

A processor having high processing speed has been required corresponding to requirements for higher speed and higher functions in high speed processing device. The Very Long Instruction Word (which is abbreviated as VLIW) is one of techniques for enhancing the speed of processors. In a processor applying the VLIW technique, order relations between instruction words or data dependency relations are analyzed in compiling programs to extract a group of instruction words which can be performed simultaneously. Based on such processing, high performance is realized by simultaneous performing of a plurality of instruction words without a run-time overhead.

With to the VLIW technique, hardware can be simplified, cache can be easily increased, and a clock frequency can be easily increased. Further, it is required for a VLIW processor to merely process read-in instruction directly. For example, in hardware applying a superscalar technique and so on, a circuit for extracting instructions which can be performed simultaneously is required. However, in the VLIW processor, such a circuit is not required. In this manner, the VLIW processor does not depend on a circuit having a complex configuration, so that it can be applicable to a low power consumption type embedded system.

Further, a VLIW processor can be perform a very long instruction composed of a plurality of instruction words (calculation, load, and so on). Moreover, as described above, in a VLIW processor, the processing for extracting instruction words which are performed simultaneously can be carried out by only one time processing of compiling, so that the overhead accompanied with parallel processing is very small. On the other hand, in the VLIW processor, when the number of instruction words which can be performed simultaneously is not reach the maximum number of simultaneously performable instruction words, it is required to insert an invalid calculation instruction word in the very long instruction, so that there is a case where the density of the instruction code decreases.

As a technique for preventing the decrease of the density of an instruction code, a related technique disclosed in Japanese Patent Application Publication JP-P2004-078627A is known. In the related technique, as shown in FIG. 1, by adding a successive instruction prescription bit α which indicates whether the successive instruction word is simultaneously performed for each of the instruction words to a very long instruction P composed of an instruction word group $I_k$ ($k \geq 1$), the number of instruction words consisting the very long instruction P can be able to determine, so that the very long instruction P whose length is variable is realized. In this manner, invalid calculation instruction word which is not required is eliminated from the very long instruction P, so that the decrease of the density of an instruction code can be prevented.

In the information processing device for the VLIW instruction described in the above related technique, the number of instruction words is determined in accordance with the successive instruction prescription bit included in the very long instruction. Therefore, in the information processing device for the VLIW instruction described in the above related technique, it is required to fetch instruction words whose number is equal to the maximum number of simultaneously performable instruction words necessarily, and to check successive instruction prescription bits added to all of the instruction words. Therefore, in the information processing device for the VLIW instruction described in the above related technique, when the number of instruction words which are performed simultaneously does not reach the maximum number of simultaneously per formable instruction words, unnecessary instruction words are also fetched. Further, in a general VLIW processor, an average number of instruction words performed simultaneously is about half of the maximum number of the simultaneously performable instruction words. As a result, about a half of fetch of a very long instruction performed on the information processing device for the VLIW instruction described in the above related technique becomes unnecessary operation, so that it causes an invalid power consumption.

CITATION LIST

Patent Document 1: Japanese Patent Application Publication JP-P2004-078627A

SUMMARY OF INVENTION

An object of the present invention is to provide an information processing device and an information processing method for specifying [a use memory bank which is used in the next cycle] and [a nonuse memory bank which is not used in the next cycle] [[from [an instruction address indicating a head memory bank which shores a head part of the very long instruction of the next cycle] and [the memory bank number storing an instruction word group consisting the very long instruction of the next cycle]]].

Another object of the present invention is to provide an information processing device and an information processing method for controlling the nonuse memory bank specified by the above method to suppress the fetch of unnecessary instruction words from the memory bank.

According to a first aspect of the present invention, an information processing device for processing the VLIW is provided. The information processing device includes: a plurality of memory banks; a program counter; a memory bank control device; an instruction decoder; and an arithmetic device. The plurality of memory banks stores an instruction word group consisting a very long instruction. The program counter outputs an instruction address indicating a head memory bank which stores a head part of the very long instruction of a next cycle. The memory bank control device specifies a use memory bank which is used in a next cycle and a nonuse memory bank which is not used in a next cycle from the instruction address to the very long instruction and the number of the plurality of the memory banks relating to the very long instruction to control an operation of the nonuse memory bank. The instruction decoder decodes the very long instruction which is fetched from the use memory bank. The arithmetic device performs the decoded very long instruction.

According to a second aspect of the present invention, an information processing method for processing the VLIW is provided. The information processing method includes: outputting an instruction address indicating a head memory bank which stores a head part of an instruction word group consisting a very long instruction of a next cycle; specifying a use memory bank which is used in a next cycle and a nonuse memory bank which is not used in a next cycle from the instruction address to the very long instruction and the number of the plurality of the memory banks relating to the very long instruction; controlling an operation of the nonuse memory bank; fetching the very long instruction of a next cycle from the use memory bank; decoding the very long instruction; and performing the fetched very long instruction.

According to the present invention, it is possible to provide an information processing device for controlling a nonuse memory bank which is not used in the next cycle to suppress the fetch of unnecessary instruction words from the memory bank. As a result, it becomes possible to provide an information processing device for processing the VLIW with high performance and low power consumption.

BRIEF DESCRIPTION OF DRAWINGS

The above mentioned purposes, effects, and features of the invention will be clarified from the description of embodiments in cooperation with the attached drawings, in which:

FIG. 6 is a view showing an implementation result of an embodiment of the present invention.

DESCRIPTION OF EMBODIMENTS

Referring to the attached drawings, some embodiments of the present invention will be explained below. However, the embodiments do not limit the technical scope of the present invention.

[First Embodiment]

An embodiment of an information processing device according to the present invention will be explained below referring to the accompanying drawings by exemplifying an information processing device for the VLIW instruction.

Figure 1:
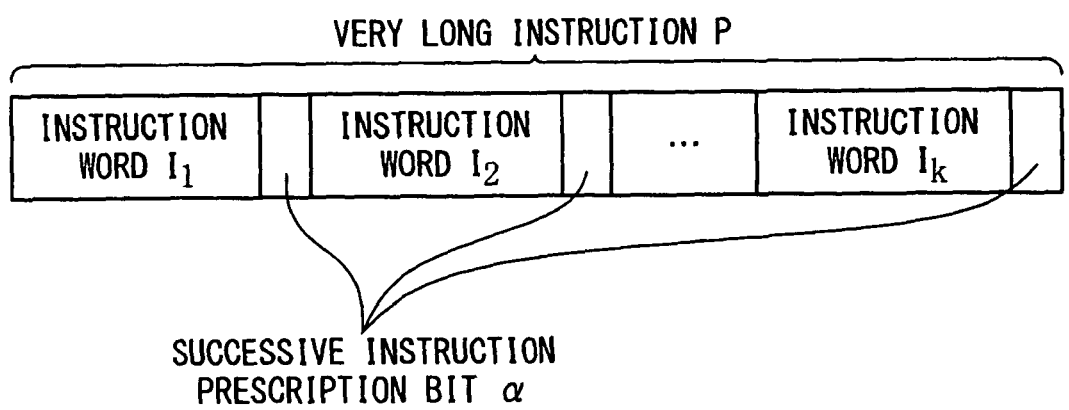
FIG. 1 is a view showing a configuration of a very long instruction in a related technique.
Figure 2:
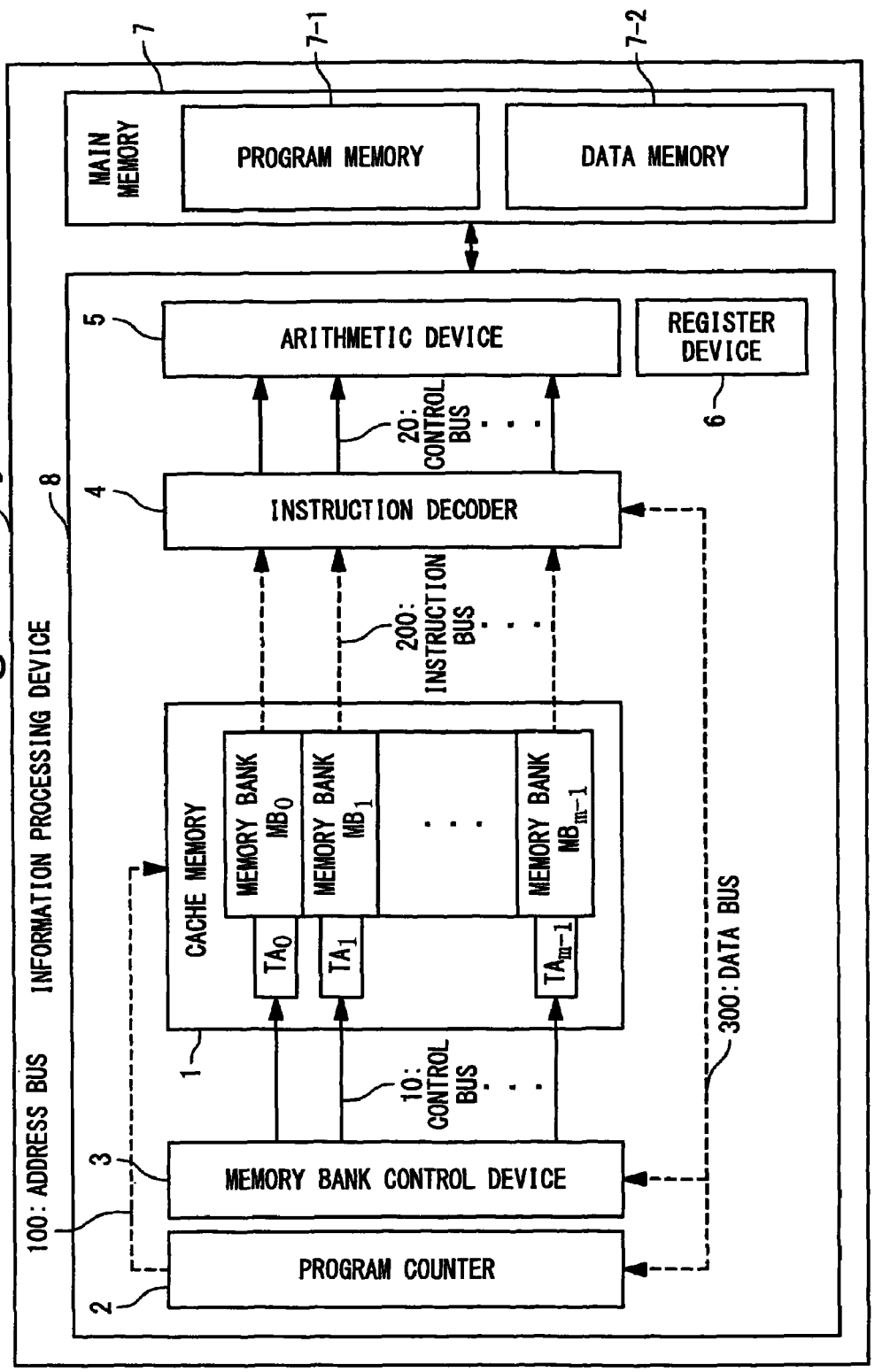
FIG. 2 is a configuration view of an information processing device showing an embodiment of the present invention.

FIG. 2 shows a block diagram exemplifying a configuration of an information processing device D according to the present embodiment. The information processing device D has an instruction supply device 8. The instruction supply device 8 has a cache memory 1, a program counter 2, a memory bank control device 3, an instruction decoder 4, an arithmetic device 5, and a register device 6. The cache memory 1 has the m number of memory banks $MB_0$ to $MB_{m-1}$ ($m \geq 1$), and performs the data management of the memory bank $MB_0$ to the memory bank $MB_{m-1}$ and the cache control thereof.

The memory bank $MB_0$ to the memory bank $MB_{m-1}$ preferably have a storage device represented by the SDRAM (Synchronous Dynamic Random Access Memory), the MRAM (Magnetroresistive Random Access Memory), and the SRAM (Static Random Access Memory). As shown in FIG. 2, control terminals $TA_0$ to $TA_{m-1}$ ($m \geq 1$) are formed on the memory banks $MB_0$ to $MB_{m-1}$ respectively by one-to-one correspondence. The memory bank control device 3 sends a chip enable (CE) signal to the control terminals $TA_0$ to $TA_{m-1}$ ($m \geq 1$) to control the operation of the memory bank $MB_0$ to the memory bank $MB_{m-1}$.

Figure 3:
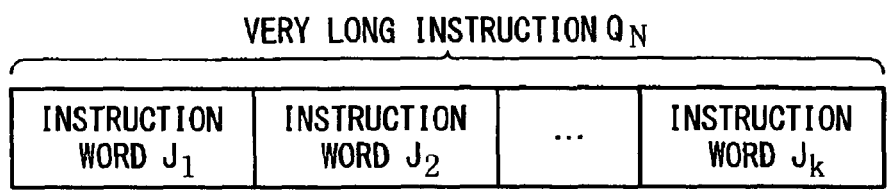
FIG. 3 is a view showing a configuration of a very long instruction of a present invention.

FIG. 3 is a block diagram exemplifying a configuration of a very long instruction $Q_N$ of the next cycle. The very long instruction $Q_N$ consists of an instruction word group of the instruction word $J_1$ to $J_k$ ($k \geq 1$). The memory bank control device 3 specifies the use memory bank $MB_{yes}$ which is used in the next cycle N and the nonuse memory bank $MB_{no}$ which is not used in the next cycle based on an instruction address $A_N$ indicating a head memory bank $MB_t$ where a head part of the very long instruction $Q_N$ in the next cycle N is stored and the memory bank number $X_N$ where the instruction word group of the instruction word $J_1$ to the instruction word $J_k$ ($k \geq 1$) is stored. Here, the head memory bank $MB_t$ is specifically determined by the $\beta$ bit in the instruction address. The $\beta$ bit may be a bit of any location in the instruction address $A_N$. However, generally, the lower $\beta$ bit of the instruction address $A_N$ is used for.

Though the instruction word group consisting the very long instruction $Q_N$ may be stored in the memory bank $MB_0$ to the memory bank $MB_{m-1}$ at random, the cost of the information processing device itself increases in general. Therefore, in the information processing device D, the instruction word group is assumed to be stored in continuous memory banks from the memory bank $MB_0$ to the memory bank $MB_{m-1}$.

The information processing device D selectively accesses the use memory bank $MB_{yes}$ when the number of the instruction words performed simultaneously by the arithmetic device 5 does not reach the maximum number of the simultaneously performable instruction. In other words, the information processing device D does not fetch the instruction word group in the next cycle N from the nonuse memory bank $MB_{no}$. The memory bank control device 3 sends a control signal for flagging to the nonuse memory bank $MB_{no}$ via the control bus 10. The information processing device D selectively fetches an instruction word from a use memory bank $MB_{yes}$ being not flagged after the memory bank $MB_0$ to the memory bank $MB_{m-1}$ are scanned.

The electric power consumed in the fetching of the data from the memory banks $MB_0$ to $MB_{m-1}$ is larger than the electric power consumed for retaining data in the memory banks $MB_0$ to $MB_{m-1}$. Therefore, the power consumption for fetching is decreased by selectively fetching instruction word groups from the unflagged use memory bank $MB_{yes}$, so that the power consumption for fetching is decreased and the power consumption of whole of the memory banks $MB_0$ to $MB_{m-1}$ is suppressed.

The memory bank control device 3 controls the power consumption by stopping the operation of the nonuse memory bank $MB_{no}$ which is not used in the next cycle N. The memory bank control device 3 sends a chip enable (CE) signal to the control terminal $Ta_i$ corresponding to the nonuse memory bank $MB_{no}$ to invalidate (or stop) the nonuse memory bank $MB_{no}$. After that, the electric power is not supplied to the invalidated (or stopped) nonuse memory bank $MB_{no}$.

The program counter 2 outputs an instruction address $A_N$ which indicates the head memory bank $MB_t$ where a head part of a very long instruction $Q_N$ is stored. When the program counter 2 outputs the instruction address $A_N$, the information processing device D points the memory banks $MB_0$ to $MB_{m-1}$ in the cache memory 1 based on the instruction address $A_N$ via the address bus 100.

The information processing device D adds the number of the memory banks $X_N$ where the very long instruction $Q_N$ to be fetched in the next cycle N to the program counter value supplied from the program counter 2 to generate the instruction address $A_{N+1}$ to the very long instruction $Q_{N+1}$ of the next-to-next cycle to update the program counter value.

The instruction decoder 4 decodes the very long instruction $Q_N$ which is fetched from the memory banks $MB_0$ to $MB_{m-1}$ via the instruction bus 200. And the instruction decoder 4 transmits a control signal corresponding to the content of the decoded very long instruction $Q_N$ to the arithmetic device 5 via the control bus 20. The arithmetic device 5 performs the decoded very long instruction $Q_N$. The register device 6 supplies an operand to the arithmetic device 5, stores an arithmetic result of the arithmetic device 5, and stores an operation status of an instruction, in accordance with instructions supplied from the memory banks $MB_0$ to $MB_{m-1}$.

The information processing device D preferably includes a main storage device 7 as shown in FIG. 2. The main storage device 7 includes a program memory 7-1 and a program memory 7-2. The program memory 7-1 stores application programs performed by the information processing device D. The program memory 7-2 stores data required when the information processing device D performs an arithmetic processing. Though in the explanation here, the main storage device 7 is described as an internal part of the information processing device D, the configuration of the main storage device 7 is not necessarily designed as such.

Figure 4:
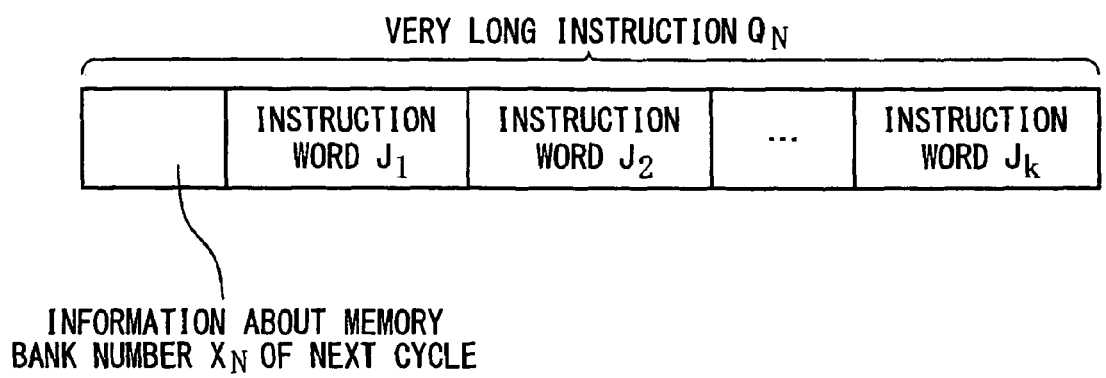
FIG. 4 is a view showing a configuration of a very long instruction showing an embodiment of the present invention.

Next, information indicating the memory bank number $X_N$ where a very long instruction $Q_N$ fetched in the next cycle is stored and a location where the information is stored are explained. As shown in FIG. 4, the information of the memory bank number $X_N$ is stored in the very long instruction $Q_{N-1}$ in the last cycle. In this case, the information of the memory bank number $X_1$ where the first very long instruction $Q_1$ is stored does not known. Therefore, it is preferable to use a fixed value as information of the memory bank number $X_1$. For example, a value set in the register device 6 can be used as the information of the memory bank number $X_1$. That value can be set by a control signal from outside of the information processing device D or an instruction for operating the register value.

Figure 5:
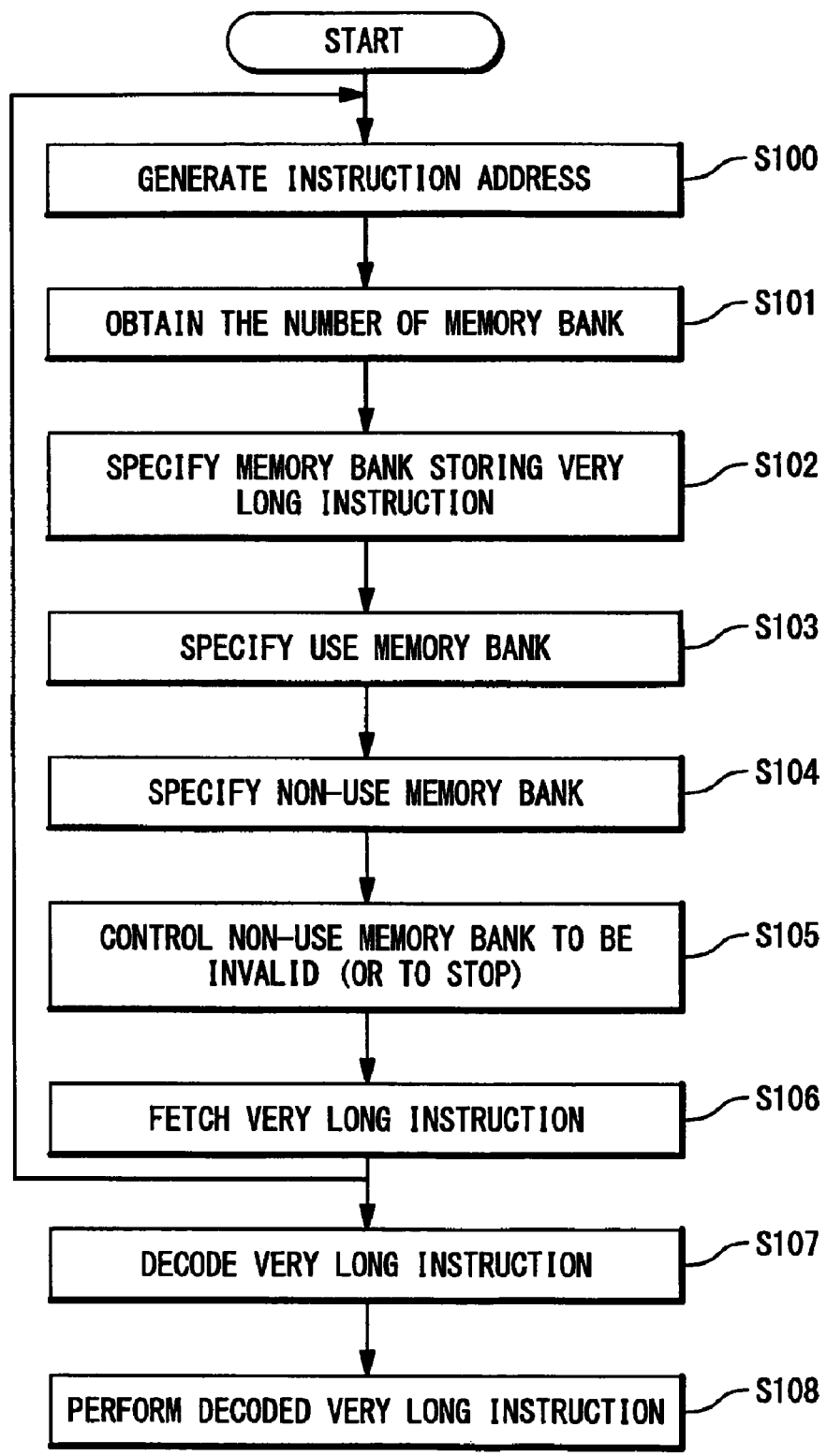
FIG. 5 is a flowchart showing an operation of an embodiment of the present invention.

Next, an information processing method according to an embodiment of the present invention is explained referring to FIG. 5. In the following, to recognize the present embodiment easily, a case where the total number of the memory bank=4 ($MB_0$, $MB_1$, $MB_2$, $MB_3$) in the clock cycles N, N+1, N+2, N+3 is exemplified. In this case, 4 instruction words at maximum can be fetched at 1 cycle. Further, it is assumed that $X_N=2$, $X_{N+1}=1$, $X_{N+2}=4$, $X_{N+3}=3$. Though the memory banks $MB_0$ to $MB_m$ are counted in any manner, generally, adjacent memory banks in one clockwise direction are counted continuously, and $MB_0$, $MB_2$, $MB_3$ are continuous memory banks.

FIG. 6 shows a result of a transmission of a control signal transmitted by the memory bank control device 3 to the memory banks $MB_0$, $MB_1$, $MB_2$, $MB_3$ via the control bus 10. The statuses of the memory banks $MB_0$, $MB_1$, $MB_2$, $MB_3$ when the memory bank control device 3 sends signals to invalidate (or to stop) the respective memory banks are assumed to be $S-MB_0$, $S-MB_1$, $S-MB_2$, $S-MB_3$, respectively. When the statuses $S-MB_0$ to $S-MB_3$ are the Low level (0), the instruction fetch is performed at the rising edge of the next clock, and when the statuses $S-MB_0$ to $S-MB_3$ are the High level (1), the instruction fetch from each memory bank is not performed.

Figure 7:
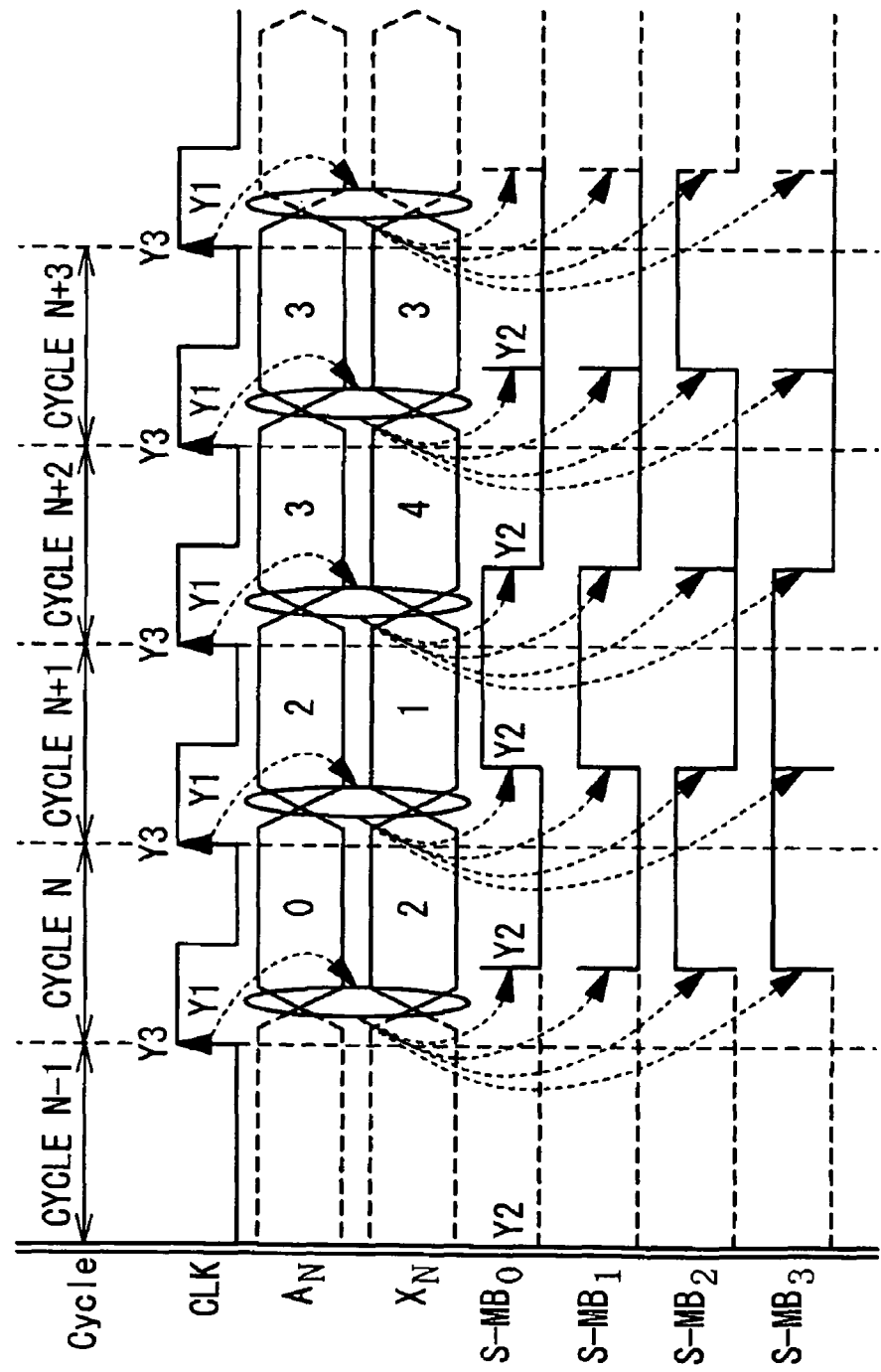
FIG. 7 is a time chart showing an operation of an embodiment of the present invention.

FIG. 7 is a timing chart exemplifying the operation of the present embodiment. Whole information processing device D is assumed to operate in synchronization with the clock signal CLK.

The information processing device D adds the information of the memory bank number XN−1 where the very long instruction QN−1 of the last cycle N−1 of the fetching is stored to the program counter value supplied from the program counter 2 in synchronization with the rising edge of the clock signal CLK, to generate the instruction address $A_N$ to the very long instruction $Q_N$ of the next cycle N. Further, the information processing device D supplies the instruction address $A_N$ to the program counter 2 in synchronization with the rising edge of the clock signal CLK (step S100 in FIG. 5).

At the same time, the information processing device D obtains the information of the memory bank number $X_N$ (in this case, $X_N=2$) where the very long instruction $Q_N$ in the next cycle N is stored from the very long instruction QN−1 of the last cycle N−1 of the fetching in synchronization with the rising edge of the clock signal CLK (step S101 in FIG. 5). The processes of the step S100 and step s101 are performed at the timing of the rising edge Y1 of the clock signal CLK between the last cycle N−1 and the next cycle N of FIG. 7.

The program counter 2 sends the instruction address $A_N$ to the memory bank control device 3. The memory bank control device 3 specifies that a head part of the very long instruction $Q_N$ of the next cycle N is stored in the memory bank MB0 from the lower 2 bits in the sent instruction address $A_N$ (step S102 in FIG. 5).

The instruction decoder 4 sends the information of the memory bank number $X_N$ of the next cycle (in this case, $X_N=2$) via the data bus 300. The memory bank control device 3 specifies that the memory banks from the memory bank $MB_0$ to the memory bank $MB_1$ which is the second in the clockwise direction are the use memory banks $MB_{yes}$ which are used in the next cycle from the sent information of the memory bank number $X_N$ of the next cycle (in this case, $X_N=2$) (step S103 in FIG. 5). The use memory bank $MB_{yes}$ used in the next cycle stores a very long instruction $Q_N$ of the next cycle. The memory banks $MB_0$, $MB_1$ corresponding to the use memory bank $MB_{yes}$ is represented by the "operation" status in FIG. 6.

Next, the memory bank control device 3 specifies the memory banks from $MB_2$ to $MB_3$ as the nonuse memory banks $MB_{no}$ which are not used in the next cycle by inverting the information that the instruction word group from the instruction words $J_1$ to $J_k$ ($k≧1$) stored in the memory banks $MB_0$ to $MB_1$ is used in the next cycle N (step S104 in FIG. 5).

In other words, the memory bank control device 3 specifies the residue obtained by removing the memory banks $MB_0$ and $MB_1$ from the memory banks $MB_0$ to $MB_{m-1}$ as the nonuse memory banks $MB_{no}$. The nonuse memory bank $MB_{no}$ does not store a very long instruction $Q_N$ in the next cycle N. The memory banks MB2, MB3 which correspond to the nonuse memory bank MBno are represented by the "stop" status in FIG. 6.

Further, the memory bank control device 3 sends a chip enable (CE) signal to the control terminal $TA_2$ of the memory bank $MB_2$ to the control terminal $TA_3$ of the memory bank $MB_3$ via the control bus 10. The memory banks from MB2 to MB3 become invalid (or stop) (step S105 in FIG. 5).

The processes of steps S102 to S105 are implemented at the timing of Y2 of the next cycle in FIG. 7. After the Y2 of the next cycle N in FIG. 7, the signals of the $S-MB_0$, $S-MB_1$ become Low level (0), respectively. In response to the Low level (0), the memory banks MB0, MB1 operate at the clock rising edge between the next cycle and the next-to-next cycle (Y3 in FIG. 7).

FIG. 7 shows that the memory banks $MB_0$, $MB_1$ are used at that clock rising edge. The signals of $S-MB_2$, $S-MB_3$ become High level (1). In response to the High level (1), the MB2, MB3 stop at the clock rising edge between the next cycle N and the next-to-next cycle N+1 (Y3 in FIG. 7). FIG. 7 shows that the memory banks $MB_2$, $MB_3$ do not used at the clock rising edge.

Next, the information processing device D fetches the very long instruction $Q_N$ consisting of the instruction word group of the instruction words J1 to $J_k$ ($k \geq 1$) stored in the memory bank $MB_0$, memory bank $MB_1$. (step S106 in FIG. 5). The process of the step S106 is implemented at the timing Y3 between the next cycle N and the next-to-next cycle N+1 being the next rising clock edge. The instruction decoder 4 decodes the fetched very long instruction $Q_N$ (step S107 in FIG. 5). The arithmetic device 5 performs the decoded very long instruction $Q_N$ (step S108 in FIG. 5). These processes are same in the cycle N+1 to the cycle N+3.

In the example where the total number of the memory banks=4 (MB0, MB1, MB2, MB3), a common information processing device for processing the VLIW, all of the four instruction words must be fetched for every cycle. Namely, 4×4=16 memory banks operate in any four cycles N to N+3.

On the other hand, the information processing device D according to the present embodiment, in any four cycles N to N+3, it is enough to fetch the number of instruction words of 2, 1, 4, 3, respectively. Namely, in any four cycles N to N+3, 2+1+4+3=10 number of memory banks operate. Therefore, the number of the memory banks operated by the information processing device D according to the present embodiment can be suppressed to be 10/16 comparing to the number of memory banks operated by a common information processing device for processing the VLIW. Note that the power consumption is proportional to the number of operating memory banks. Therefore, the power consumption of the memory banks of the information processing device according to an embodiment of the present invention is decreased to 10/16 comparing to the power consumption of the memory banks of a common information processing device for processing the VLIW.

[Second Embodiment]

A second embodiment of the present invention will be explained below. The memory bank control device 3 explained before is a device which sends a chip enable (CE) signal to the control terminals $TA_0$ to $TA_{m-1}$ to control the operation of the memory banks $MB_0$ to $MB_{m-1}$.

In the second embodiment, the memory bank control device 3 has a function to decrease the power source voltage supplied to the nonuse memory bank $MB_{no}$ which is not used in the next cycle N. The operation speed of the memory cells composing the memory banks $MB_0$ to $MB_{m-1}$ is proportional to the difference between the supplied voltage and the threshold voltage. Therefore, to operate the memory cells at high speed, it is required to increase the voltage supplied to the memory cells so that the difference becomes a certain value or more. On the other hand, the memory cells composing the nonuse memory bank $MB_{no}$ which is not used in the next cycle is not required to operate at a desired operation speed. Therefore, by the memory bank control device 3 decreasing the voltage supplied to the memory cells, it is possible to inactivate the nonuse memory bank $MB_{no}$ which is not required to operate. Because the power consumption of a memory cell is proportional to the operation voltage, by decreasing the operation voltage, the memory bank control device 3 is able to suppress and decrease the total power consumption of the memory bank.

[Third Embodiment]

A second embodiment of the present invention will be explained below. The memory bank control device 3 has a function to increase the threshold voltage of memory cells composing the nonuse memory bank $MB_{no}$ which is not used in the next cycle N. Recently, in accordance with the development of microfabrication technique of memory cells composing a memory bank, the breakdown voltage is decreased. Accordingly, the voltage supplied to memory cells is also made decreased. In addition, the threshold voltage is made decreased to insure the difference between the supplied voltage and the threshold voltage to be a certain value or more.

However, making decrease the threshold voltage results in increase of a waste power consumption which is called the leak current. Then, the memory bank control device 3 decreases the threshold voltage of the nonuse memory bank $MB_{no}$ which is not used in the next cycle N so that it becomes possible to inactivate the nonuse memory bank $MB_{no}$ which is not required to be operated. And then, the memory bank control device 3 is able to inactivate the nonuse memory bank $MB_{no}$ which is not required to be operated by increasing the threshold voltage supplied to the memory cells. The amount of the leak current is inverse proportional to the threshold voltage so that by increasing the threshold voltage, the memory bank control device 3 is able to suppress and decrease the total power consumption of the memory banks $MB_0$ to $MB_{m-1}$.

In the above, an embodiment of the memory bank control device 3 is explained in detail. However, the concrete configuration is not limited to the embodiment, and even if a variation in a scope which is not deviated from a substance of the present invention is implemented, it is included in the present invention. For example, the memory bank control device 3 does not directly control the memory banks $MB_0$ to $MB_{m-1}$ via the control terminals $TA_0$ to $TA_{m-1}$, and instead, each of the memory banks $MB_0$ to $MB_{m-1}$ itself may operate the control terminals $TA_0$ to $TA_{m-1}$ by receiving a control signal sent from the memory bank control device 3.

[Fourth Embodiment]

A fourth embodiment of the present invention will be explained below. In the fourth embodiment, the place in which the information about the number of the memory banks $X_N$ is different from the aforementioned embodiment. In the aforementioned embodiment, the information of the number of the memory banks $X_N$ is stored in a very long instruction at a last cycle.

In the fourth embodiment, the information of the number of the memory banks $X_N$ is stored in a storage device. The storage device is preferably provided as a memory bank number storage dedicated memory. The memory bank number storage dedicated memory may be prepared in the main storage device 7. Another example of the storage device is a cache memory 1. In this case, the hardware cost can be suppressed. Or the register device 6 may be used as the storage device. The number of the memory bank $X_N$ is set in the register device 6 by a control signal from an outside of the information processing device D or an instruction to operate the value of the register.

In a case where a bifurcation instruction is included in a very long instruction $Q_N$, it is required to prepare information of the number of the memory banks $X_N$ corresponding to two patterns of the bifurcation established and the bifurcation not established. The two information of the memory banks $X_N$ of the bifurcation established and not established is set as a part of the very long instruction $Q_{N-1}$ of the last cycle. In a case of fetching an instruction next to a case where a bifurcation instruction is fetched, the information of the number of the memory banks $X_N$ when the bifurcation is not established is used. In a case where a bifurcation of the bifurcation instruction is established, the information of the memory banks $X_N$ in a case where the bifurcation is established is used. Further, one of the information of two number of memory banks $X_N$ of cases of bifurcation established and bifurcation not established is set to be a fixed value, and another one is set to be a part of the very long instruction of the last cycle. The fixed value can be set by a control signal from an outside of the information processing device D or an instruction for operating the fixed value.

In the above, embodiments regarding the storage place of the information of the number of the memory banks $X_N$ is explained in detail. However, the concrete configuration is not limited to the above embodiments, and even if a variation in a scope which is not deviated from a substance of the present invention is implemented, it is included in the present invention. Further, the plurality of above mentioned embodiments can be implemented by any combinations of them in a scope where their structures or the operations do not contradict.

In recent years, for realizing a processor having a performance higher than conventional processors, there is a tendency that the number of the instruction words composing a variable length instruction increases. On the other hand, in accordance with the widespread use of mobile devices represented by a mobile telephone, needs of a processor which achieves not only high performance but also a low power consumption has been increased. According to an information processing device of the present invention, it becomes possible to provide an information processing device having a good cost performance which has a high density of the variable length instruction and achieves a low power consumption without fetching unnecessary data. Specifically, according to the present invention, it becomes possible to provide an information processing device which keeps a high performance like a VLIW processing and also achieves a low power consumption by controlling a memory bank in which an instruction word being not used at a next cycle to suppress fetching of unnecessary instruction words from the memory bank.

Further, by recent development of techniques, it becomes possible for developer of processors to neglect the cost of semiconductor integrated circuits like the LSI compared to the cost of fetching a lot of data. Therefore, according to the present invention, also in the field of embedding to high integration hardware, an information processing device which is able to achieve a low power consumption by eliminating unnecessary memory operations with keeping a high performance is provided.

The correspondence between the above embodiments and reference symbols used in the drawings will be described below. 1 indicates a cache memory. 2 indicates a program counter. 3 indicates a memory bank control device. 4 indicates an instruction decoder. 5 indicates an arithmetic device. 6 indicates a register device. 7 indicates a main memory. 7-1 indicates a program memory. 7-2 indicates a data memory. 8 indicates an instruction supply device. 10 indicates a control bus. 20 indicates a control bus. 100 indicates an address bus. 200 indicates an instruction bus. 300 indicates a data bus. $A_N$ indicates an instruction address. CLK indicates a clock signal. D indicates an in formation processing device. $MB_m$ indicates a memory bank. $MB_t$ indicates a head memory bank. $MB_{yes}$ indicates a use memory bank. $MB_{no}$ indicates a nonuse memory bank. $I_k$ indicates an instruction word group. $J_k$ ($k \geq 1$) indicates an instruction word group. N indicates a next cycle. P indicates a very long instruction. $Q_N$ indicates a very long instruction. S-$MB_0$ indicates a status of the memory bank $MB_0$. S-$MB_1$ indicates a status of the memory bank $MB_1$. S-$MB_2$ indicates a status of the memory bank $MB_2$. S-$MB_3$ indicates a status of the memory bank $MB_3$. $TA_m$ indicates a current control terminal. $X_N$ indicates the number of a memory bank. Y indicates a timing. α indicates a continuous instruction indication bit. β indicates the bit of a very long instruction.

A person skilled in the art can be easily implement various deformations of the above embodiments. Therefore, the present invention is not limited to the above embodiments, and it is interpreted as the widest scope referring to the claims and their equivalents. Further, the present invention claims the priority based on the Japanese Patent Application JP2008-222498 submitted at Aug. 29, 2008, and includes its disclosure herein.

The invention claimed is:

1. An information processing device comprising:
   a plurality of memory banks configured to store an instruction word group including a very long instruction;
   a program counter configured to output an instruction address indicating a head memory bank which stores a head part of the very long instruction of a next cycle;
   a memory bank control device configured to specify a use memory bank which is used in a next cycle and a nonuse memory bank which is not used in a next cycle from the instruction address to the very long instruction and the number of the plurality of the memory banks relating to the very long instruction to control an operation of the nonuse memory bank;
   an instruction decoder configured to decode the very long instruction which is fetched from the use memory bank; and
   an arithmetic device configured to perform the decoded very long instruction.

2. The information processing device according to claim 1, wherein a length of the very long instruction is variable, and the instruction word group including the very long instruction is stored in a continuous memory bank.

3. The information processing device according to claim 1, wherein the number of the plurality of memory banks relating to the very long instruction fetched in a next cycle is added to a program counter value supplied from the program counter, the instruction address is generated to the very long instruction of a next-next cycle, and the program counter is updated.

4. The information processing device according to claim 1, wherein the memory bank control device is configured to control the nonuse memory bank to be invalid.

5. The information processing device according to claim 1, wherein the memory bank control device is configured to decrease a power source voltage supplied to the nonuse memory bank until the nonuse memory bank is inactivated.

6. The information processing device according to claim 1, wherein the memory bank control device is configured to increase a threshold voltage of a memory cell including the nonuse memory bank until the nonuse memory bank is inactivated.

7. The information processing device according to claim 1, wherein information of the number of the plurality of the memory banks is stored in a storage device.

8. The information processing device according to claim 1, wherein information of the number of the plurality of memory banks is stored in a very long instruction fetched in a last cycle.

9. An information processing method comprising:
outputting an instruction address indicating a head memory bank which stores a head part of an instruction word group including a very long instruction of a next cycle;
specifying a use memory bank which is used in a next cycle and a nonuse memory bank which is not used in a next cycle from the instruction address to the very long instruction and the number of the plurality of the memory banks relating to the very long instruction;
controlling an operation of the nonuse memory bank;
fetching the very long instruction of a next cycle from the use memory bank;
decoding the very long instruction; and
performing the fetched very long instruction.

10. The information processing method according to claim 9, wherein a length of the very long instruction is variable, and the instruction word group including the very long instruction is stored in a continuous memory bank.

11. The information processing method according to claim 9, wherein the outputting the instruction address comprises:
adding the number of the plurality of memory banks relating to the very long instruction fetched in a next cycle to a program counter value supplied from the program counter, and generating the instruction address to the very long instruction of a next-next cycle.

12. The information processing method according to claim 9, further comprising:
invalidating the nonuse memory bank to the very long instruction in the next cycle.

13. An instruction supply device for a processor performing a very long instruction including a plurality of instruction words and whose length is variable, comprising:
a plurality of memory banks configured to store the very long instruction; and
a memory bank control device configured to control an operation of the plurality of memory banks,
wherein the memory bank control device is configured to specify a memory bank which is not used in a next instruction fetch from memory bank number information indicating the number of the plurality of memory banks used in the next instruction fetch and an instruction address.

14. The instruction supply device according to claim 13, wherein the memory bank control device is configured to stop the nonuse memory bank by using a chip enable (CE) signal for controlling an operation and a stop of the plurality of memory banks.

15. The instruction supply device according to claim 13, wherein the memory bank control device is configured to decrease a power source voltage supplied to the nonuse memory bank.

16. The instruction supply device according to claim 13, wherein the memory bank control device is configured to increase a threshold voltage supplied to the nonuse memory bank.

17. The instruction supply device according to claim 13, wherein the memory bank number information is stored in the very long instruction fetched in a last cycle.

18. The instruction supply device according to claim 13, wherein the memory bank number information includes a fixed number of initial values, and
the fixed number is set or changed by a memory bank number control signal or a change instruction of memory bank number information from an outside.

19. The instruction supply device according to claim 13, wherein the memory bank number information is stored in a memory bank number memory for storing the memory bank number information, and
the memory bank number memory is configured to be referred by an instruction address used in a last instruction fetch.

20. A processor comprising the instruction supply device according to claim 13.

* * * * *